No. 12,225. REISSUED MAY 24, 1904.
W. C. SMITH.
PISTON RING.
APPLICATION FILED APR. 28, 1904.
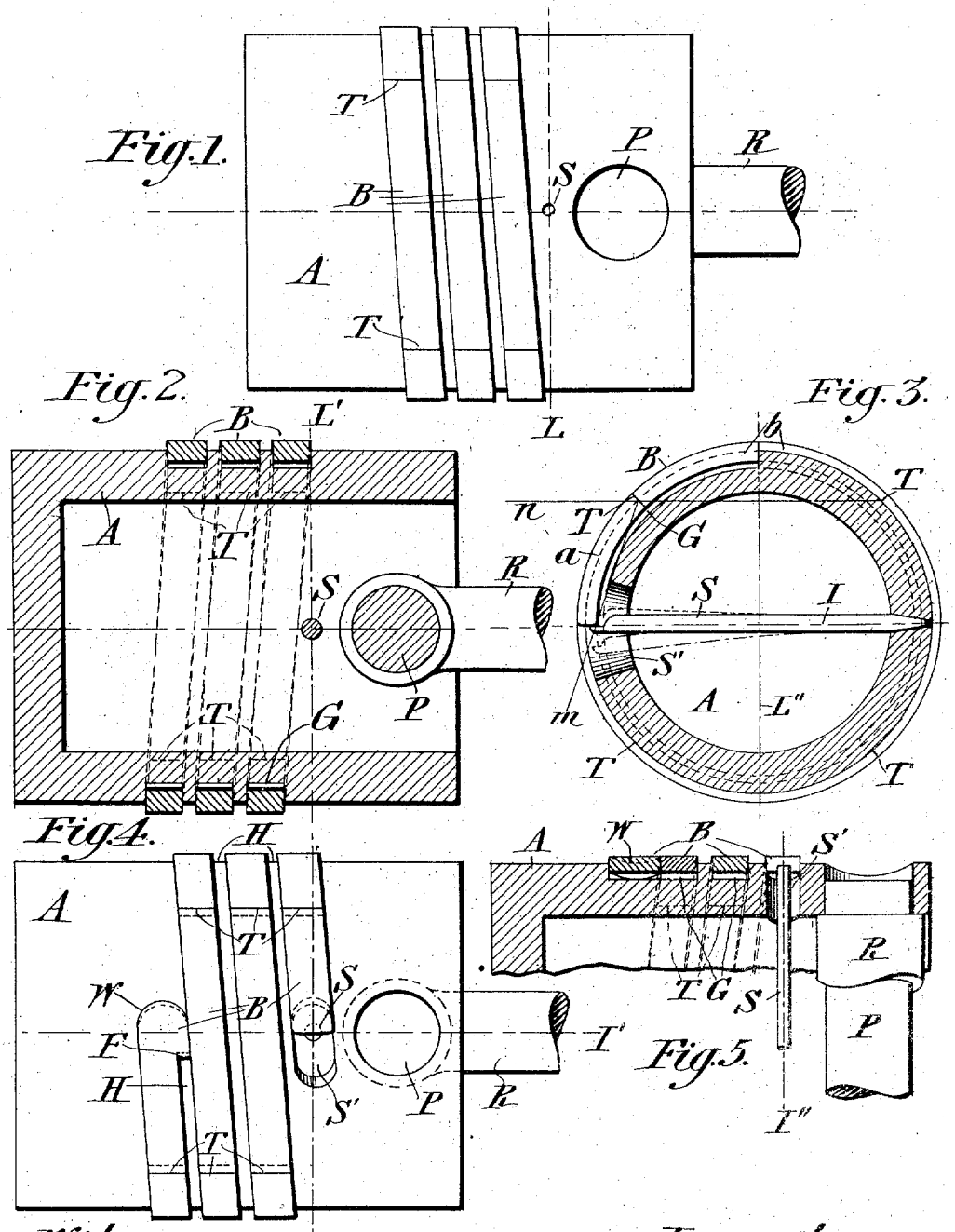
Witnesses:
W. K. Sanborn
J. A. Scott
Inventor:
William Cobb Smith No. 12,225. Reissued May 24, 1904.

UNITED STATES PATENT OFFICE.

WILLIAM COBB SMITH, OF AMESBURY, MASSACHUSETTS.

PISTON-RING.

SPECIFICATION forming a part of Reissued Letters Patent No. 12,225, dated May 24, 1904.

Original No. 757,065, dated April 12, 1904. Application for reissue filed April 28, 1904. Serial No. 205,428.

*To all whom it may concern:*

Be it known that I, WILLIAM COBB SMITH, a citizen of the United States, residing at Amesbury, in the county of Essex and State of Massachusetts, have invented certain new and useful Improvements in Piston-Rings, of which the following is a specification.

My invention relates to improvements in piston-rings of hydrocarbon-motors.

The principal object of the invention is to provide a metallic packing-ring which will expand in the cylinder without losing in efficiency.

A further object is to provide independent means for securing the necessary pressure against the cylinder-walls.

As far as I am aware the following are novel features in a piston-ring—viz., a spiral ring divided transversely into several parts and said parts being in close end-to-end contact, a spiral ring having but little resiliency in itself, but provided with an independent spring for producing the necessary pressure against the cylinder-walls, a spiral ring and a spiral peripheral piston-groove to receive said ring, a spiral ring having a free end in contact with a spring, whereby the ring may always accommodate itself to differences in ring and cylinder expansion, and a spiral ring having a stop at one end to prevent rotation about the piston.

In the drawings, Figure 1 is a side view. Fig. 2 is a central vertical longitudinal section in plane of line L'', Fig. 3. Fig. 3 is a vertical transverse section in plane of line L', Fig. 2. Fig. 4 is a side view, and Fig. 5 a horizontal longitudinal section, in plane of line I', Fig. 4.

In the drawings the same letters refer to like parts.

A represents the piston, R the connecting-rod, and P the connecting-rod pin.

B represents a piston-ring, and W a wide portion of said ring.

S' represents a slot, and G a spiral groove, in the piston-periphery.

H represents the wall of groove G, a part of which is cut away to receive the wide portion W of the ring. The ring B is adapted to fit closely in the groove G, and the wide portion W conforms with the shape of groove G at one end.

The ring B is divided into segments which are not necessarily of uniform length. The ends of the segments may be cut square, as shown, or in any suitable manner.

T T represent the divisions in the ring B or the contacting ends of the segments.

S represents a straight wire spring shouldered to receive the ring B. The spring S is also tapered to fit a hole in the wall of the piston A. The action of the spring S in the slot S' is shown by dotted lines.

The lines *m* and *n* pass through the contacting ends of segments *a* and *b* and represent lines of force from the spring S. Since *m* and *n* are not in the same straight line, the segments *a* and *b* are not only maintained in close mutual contact, but in close contact with the cylinder-walls by the pressure of spring S. Thus each segment of the ring B is maintained in perfect contact with the cylinder-walls, the degree of pressure being governed by the tension of the spring S. The ring B is divided into segments in order to overcome the evil effects of contortion by heat. The wide portion W of the ring B is provided to close the opening between the wall H of the piston-groove and the cylinder-walls. The end of groove G at W is a stop for ring B. The groove-wall H is cut down squarely at F. Having no slit or opening, this ring cannot lose in efficiency by wear.

I I' I'' and L L' L'' are broken lines in the several views.

Having thus described my invention, what I claim, and desire to secure by Letters Patent, is—

1. In a piston, a spiral peripheral metallic packing-ring, a spiral peripheral groove adapted to receive said ring, a stop at one end of said groove, and means for maintaining said ring in close contact with said stop.

2. In a piston, a spiral peripheral metallic packing-ring divided in several parts, a spring secured in said piston adapted to maintain said parts in close end-to-end contact, and said spring also adapted to maintain said parts in close contact with the cylinder-walls.

3. In a piston, a spiral peripheral metallic packing-ring divided transversely in several parts, each part being less than a turn of the spiral, a spiral peripheral groove in said piston having a stop at one end, a spring secured in said piston adapted to maintain said ring in close contact with said stop, and said spring also adapted to maintain said parts in close end-to-end contact, and in close contact with the cylinder-walls.

4. In a piston, a spiral peripheral metallic packing-ring divided transversely in several parts, each part being less than a turn of the spiral, a spring secured in said piston adapted to maintain said parts in close contact, a spiral peripheral groove in said piston adapted to receive said ring, a cut-away portion in the groove-wall at one end, and a widened portion of the ring adapted to fit into said cut-away portion, substantially as and for the purposes set forth.

In testimony whereof I affix my signature in presence of two witnesses.

WILLIAM COBB SMITH.

Witnesses:
J. M. SHORT,
W. S. VILLUM.